(No Model.)

C. S. PALM.
DEVICE FOR HANDLING CANE.

No. 426,308. Patented Apr. 22, 1890.

Witnesses:

Inventor
C. S. Palm
By W. R. Stringfellow
Attorney

UNITED STATES PATENT OFFICE.

CARL S. PALM, OF NEAR FOSTER, LOUISIANA.

DEVICE FOR HANDLING CANE.

SPECIFICATION forming part of Letters Patent No. 426,308, dated April 22, 1890.

Application filed December 14, 1889. Serial No. 333,834. (No model.)

*To all whom it may concern:*

Be it known that I, CARL SEGGENOT PALM, a citizen of the United States, residing near Foster P. O., in the parish of St. Mary and State of Louisiana, have invented certain new and useful Improvements in Devices for Handling Cane; and I do declare the following to be a full, clear, and exact description of the invention, such as will enable others skilled in the art to which it appertains to make and use the same.

My invention relates to an improvement in devices for handling cane, in which slings adjusted to body of cane-cart are made to operate in conjunction with a chain, bar, and derrick; and the objects of my improvements are to facilitate the handling of cane from cart to cars. I attain these objects by the mechanism illustrated in the accompanying drawings, in which—

Figure 1:
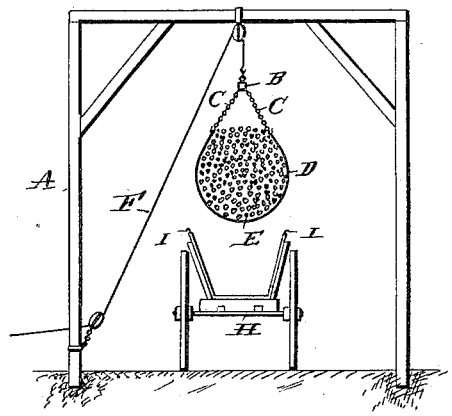
Figure 2:
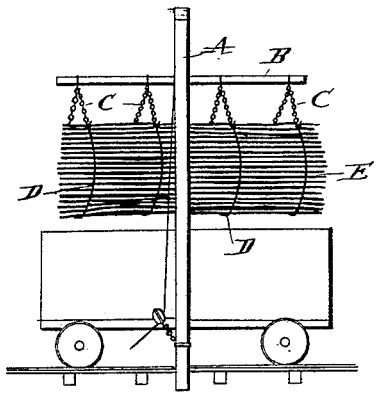
Figures 3, 4:
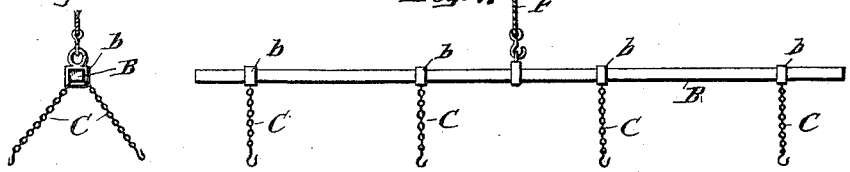
Figure 5:
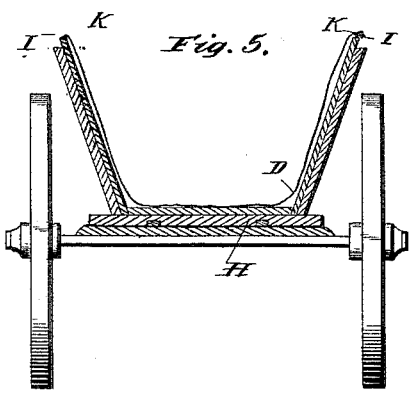
Figure 6:
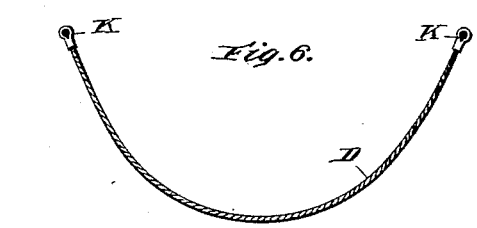
Figure 7:
Figure 8:
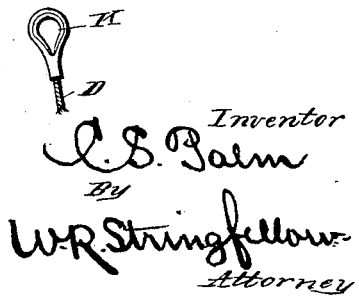

Figure 1 is a front view showing cart under derrick and cane suspended above the cart. Fig. 2 is a side view showing cane in position to be dumped into car. Fig. 3 is a front view showing chains attached to bar. Fig. 4 is a side view showing derrick-bar with chains attached. Fig. 5 is a sectional view of cart, showing sling in position before cane is placed in carts. Fig. 6 is a view of sling. Fig. 7 is a side view of eyelet in sling. Fig. 8 is a front view of eyelet and portion of sling.

Similar letters refer to similar parts throughout the several views.

In constructing my device I use a sling, as shown by D in Fig. 6, with eyelets, as shown by K. These slings are adjusted to a cart-body, as shown in Fig. 5, the eyelets K being placed over the projections I, adjusted to side of cart-body H.

B is a bar, which may be of any desired material, having bands b secured thereon at proper distances apart, and to which are adjusted chains C, said chains having hooks on their ends, and so constructed as to be readily adjusted within eyelets K.

A is a frame of derrick.

F is a rope or chain passing through pulley-blocks, as shown in Fig. 1.

The mode of operation is as follows: The cane is placed in the cart upon slings and carried from the field to the derrick shown in Fig. 1. The bar B is raised and the hooks of chains C are inserted within eyelets K, and by means of rope or chain F the cane E is raised from the cart, as shown in Fig. 1, and placed in car J, as shown in Fig. 2. The rope or chain F may be operated by any motor-power desired.

A striking advantage of my device is the saving of labor, being enabled with three men to perform the labor of thirty men formerly employed.

Having fully described my invention, what I claim, and desire to secure by Letters Patent, is—

A device for handling cane, consisting of a frame, a bar suspended therefrom having bands secured thereon at proper distances apart, a pair of chains secured to each band, each chain having a hook at its free end, and a sling for each pair of chains, having an eye in its ends for engaging with the hook on the chains when unloading the cart and adapted to engage with pins upon the sides of the cart when the cart is being loaded, substantially as specified.

In testimony whereof I affix my signature in presence of two witnesses.

CARL S. PALM.

Witnesses:
JOHN W. BROWN,
PERCY D. PARKS.